(12) United States Patent
Colby et al.

(10) Patent No.: US 7,490,154 B2
(45) Date of Patent: *Feb. 10, 2009

(54) METHOD, SYSTEM, AND STORAGE MEDIUM FOR PROVIDING CONTEXT-BASED DYNAMIC POLICY ASSIGNMENT IN A DISTRIBUTED PROCESSING ENVIRONMENT

(75) Inventors: Logan M. Colby, Rochester, MN (US); Jeffrey A. Frey, New Paltz, NY (US); Robert H. High, Round Rock, TX (US); Christopher P. Vignola, Port Jervis, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/972,289

(22) Filed: Jan. 10, 2008

(65) Prior Publication Data

US 2008/0133637 A1 Jun. 5, 2008

Related U.S. Application Data

(63) Continuation of application No. 10/674,998, filed on Sep. 30, 2003, now Pat. No. 7,349,966.

(51) Int. Cl.
*G06F 15/173* (2006.01)
*G06F 17/00* (2006.01)
*G06F 9/46* (2006.01)

(52) U.S. Cl. .................. 709/226; 709/202; 709/229; 726/1; 718/100

(58) Field of Classification Search ............... 709/226, 709/202, 229; 726/1; 718/100

See application file for complete search history.

(56) References Cited

U.S. PATENT DOCUMENTS 5,968,176 A 10/1999 Nessett et al.

(Continued)

FOREIGN PATENT DOCUMENTS

EP 1220510 A2 7/2002

(Continued)

OTHER PUBLICATIONS

IBM Research Disclosures, "Dynamic Loading of Locale Specific Hyper Text Markup Language (HTML) Pages", Mar. 1998, p. 308-40791.

(Continued)

*Primary Examiner*—David Lazaro
(74) *Attorney, Agent, or Firm*—Cantor Colburn LLP; Geraldine Monteleone

(57) ABSTRACT

An exemplary embodiment of the invention relates to a method, system, and storage medium for providing context-based dynamic policy assignment in a distributed processing environment. The system includes a first resource management host in communication with a client system, an application executable by the first resource management host, a dynamic policy assignment system executing on the first resource management host, policies stored on the first resource management host and an application profile associated with the client system. The application profile is received by the first resource management host. Application hosting services include executing the application on behalf of the client system. The dynamic policy assignment system receives the request, and based upon a task name associated with the application profile, selects at least one policy for an application instance. The dynamic policy assignment system further associates the policy to the application, and the host system executes the application.

2 Claims, 4 Drawing Sheets

U.S. PATENT DOCUMENTS

| | | |
|---|---|---|
| 6,044,466 A | 3/2000 | Anand et al. |
| 6,158,010 A | 12/2000 | Moriconi et al. |
| 6,167,445 A | 12/2000 | Gai et al. |
| 6,173,322 B1 | 1/2001 | Hu |
| 6,209,101 B1 | 3/2001 | Mitchem et al. |
| 6,347,376 B1 | 2/2002 | Attwood et al. |
| 6,393,474 B1 | 5/2002 | Eichert et al. |
| 6,466,947 B2 | 10/2002 | Arnold et al. |
| 6,466,984 B1 | 10/2002 | Naveh et al. |
| 6,484,261 B1 | 11/2002 | Wiegel |
| 6,487,552 B1 | 11/2002 | Lei et al. |
| 6,499,110 B1 | 12/2002 | Moses et al. |
| 6,505,244 B1 | 1/2003 | Natarajan et al. |
| 6,671,724 B1 | 12/2003 | Pandya et al. |
| 7,076,562 B2 | 7/2006 | Singhal et al. |
| 2003/0229501 A1 | 12/2003 | Copeland et al. |
| 2004/0059946 A1 | 3/2004 | Price |

FOREIGN PATENT DOCUMENTS

| | | | |
|---|---|---|---|
| GB | 2356764 A | 5/2001 | |

OTHER PUBLICATIONS

IBM developerWorks, Calvin Powers, "Context-Based Role Assignment with Tivoli SecureWay Privacy Manager", Apr. 2001, pp. 1-5.

JSEF Concepts, "JSEF's Enhanced Policy Semantics", Jan. 2003, pp. 1-6.

S.A.Demurjian et al., "Software Architectural Alternatives for User Role-Based Security Policies", date unknown, pp. 1-4, 1998.

METHOD, SYSTEM, AND STORAGE MEDIUM FOR PROVIDING CONTEXT-BASED DYNAMIC POLICY ASSIGNMENT IN A DISTRIBUTED PROCESSING ENVIRONMENT

CROSS-REFERENCE TO RELATED APPLICATIONS

This application is a continuation of U.S. patent application Ser. No. 10/674,998 filed Sep. 30, 2003, the contents of which are incorporated by reference herein in their entirety.

BACKGROUND

The present invention relates generally to web hosting services, and more particularly, the invention relates to a method, system, and storage medium for providing context-based dynamic policy assignment in a distributed processing environment.

Building and deploying Web-based enterprise applications online has been made possible through application hosting environments such as Microsoft's .NET™ and Java 2 Platform Enterprise Edition™ (J2EE). These hosting environments include services, APIs, and protocols that allow developers to build these Web-based applications.

The J2EE application environment is, by nature, a network-oriented, distributed object execution environment. In such environments, it is common for various policies to be assigned to application components within the network such as security, transaction, persistence, and performance policies. However, J2EE applications providers (e.g., BEA, Oracle, Sun) allow for only static declaration of these such policies. There is currently no way to dynamically select these policies based on information provided by the application client, such as identity or some other identifier that would specifically be used by the application server to assign a particular policy to this particular execution. Moreover, the need to dynamically assign policy as a client invocation request works its way through the distributed network, visiting one application server after another, is similarly unresolved.

Current attempts to resolve the problem include making multiple copies of the distributed application in order to assign different static policies to each application instance. All application instances are then made available on the network and the clients must access the appropriate application instance in order to execute the set of policies pertinent to that client's usage of the application. Having multiple copies of the same application significantly increases the cost and complexity of managing application upgrades and requires greater compute resources, particularly storage.

What is needed therefore, is a way provide dynamic policy assignment to application instances.

SUMMARY

An exemplary embodiment of the invention relates to a method, system, and storage medium for providing context-based dynamic policy assignment in a distributed processing environment. The system comprises: a first resource management host in communication with a client system via a distributed network architecture; at least one application executable by the first resource management host; a dynamic policy assignment system executing on the first resource management host; a plurality of policies stored on the first resource management host; and an application profile associated with the client system. The application profile is received by the first resource management host to receive application hosting services. The application hosting services include executing the application on behalf of the client system. The dynamic policy assignment system receives the request at the first resource management system, and based upon a task name associated with the application profile, selects at least one policy for an application instance related to the request. The dynamic policy assignment system further associates the policy to the application, and the host system executes the application on behalf of the client system. The invention also includes a method and a storage medium.

BRIEF DESCRIPTION OF THE DRAWINGS

Referring now to the drawings wherein like elements are numbered alike in the several FIGURES.

DETAILED DESCRIPTION

The disadvantages of the aforementioned solutions are overcome by the dynamic policy assignment system of the invention. The dynamic policy assignment system provides a dynamic selection mechanism that enables an application server to select from a set of policies assigned to an application using an application profile as the basis for choosing which policy(ies) to apply for a given client interaction.

This selector originates with the client and is passed as invocation context to the application server. This context is maintained with the overall invocation context and flows from component to component, from application server to application server, as the client request works its way through the distributed network. This solution enables a single copy of an application to support multiple dynamic policies, which simplifies the application administration and management, and requires less storage than having multiple copies of the application.

The selector used by the dynamic policy assignment system is referred to as an application profile. An application profile has a task name that can be manually assigned to the client or defaulted. The task name flows in the remote method invocation context, which may be CORBA IIOP based. The task name may be used by the application server at any point to select from available policies that have been assigned by an administrator to the application. The administer can also configure "task name switches" in the application server such that the application profile task name changes from what was originally assigned to the client to another name before the distributed request flows to the next application server.

In one embodiment, options for both declarative and programmatic task name assignments on a component and method may be provided. Security features may additionally be added to provide access control over the use of particular application profile task names. While the dynamic policy assignment system is described herein with respect to a J2EE hosting environment, it will be readily understood by those skilled in the art that the features and functions of the invention may be extended beyond J2EE application servers to include other resource managers that are accessed by the distributed method flow of control, including database managers, message queue manager, workload managers, security managers, and other transaction servers (e.g., CICS/IMS).

Figure 1:
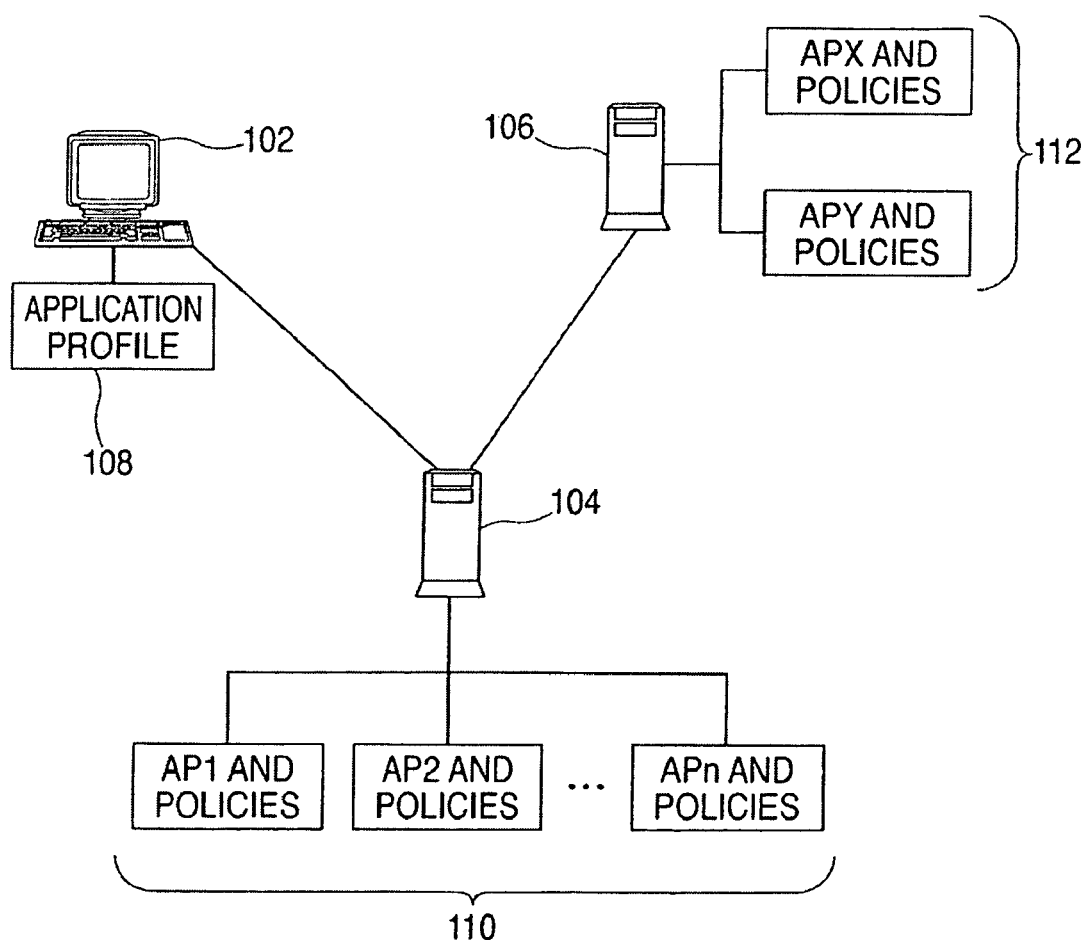
FIG. 1 is a block diagram illustrating a system upon which the dynamic policy assignment system is implemented in one embodiment.

The system 100 of FIG. 1 includes a client system 102 in communication with servers 104 and 106 over a distributed network architecture. Client system 102 refers to a computer device that electronically requests distributed services from one or both of servers 104 and 106. Client system 102 may be a general purpose desktop computer or similar suitable device. Client system 102 includes an application profile 108 defined and assigned by a network administrator of system 100 for use in implementing the dynamic policy assignment system.

Servers 104 and 106 represent resource management hosts that provide distributed services to client systems such as client system 102 over a network. Servers 104 and 106 each include a high-powered multiprocessor computer that is in communication with a client system 102 over a communications network such as an Intranet, Extranet, or the Internet. Servers 104 and 106 store applications and policies (110 and 112, respectively) in internal storage. Policies are assigned to application components within the network of system 100 and may include security, transaction, persistence, and performance. Policies are used by the dynamic policy assignment system in implementing the invention as described further herein.

The dynamic policy assignment system is executed on servers 104 and 106 and dynamically assigns policies to applications based upon the application profile 108 associated with a request for access to an application or component.

Figure 2:
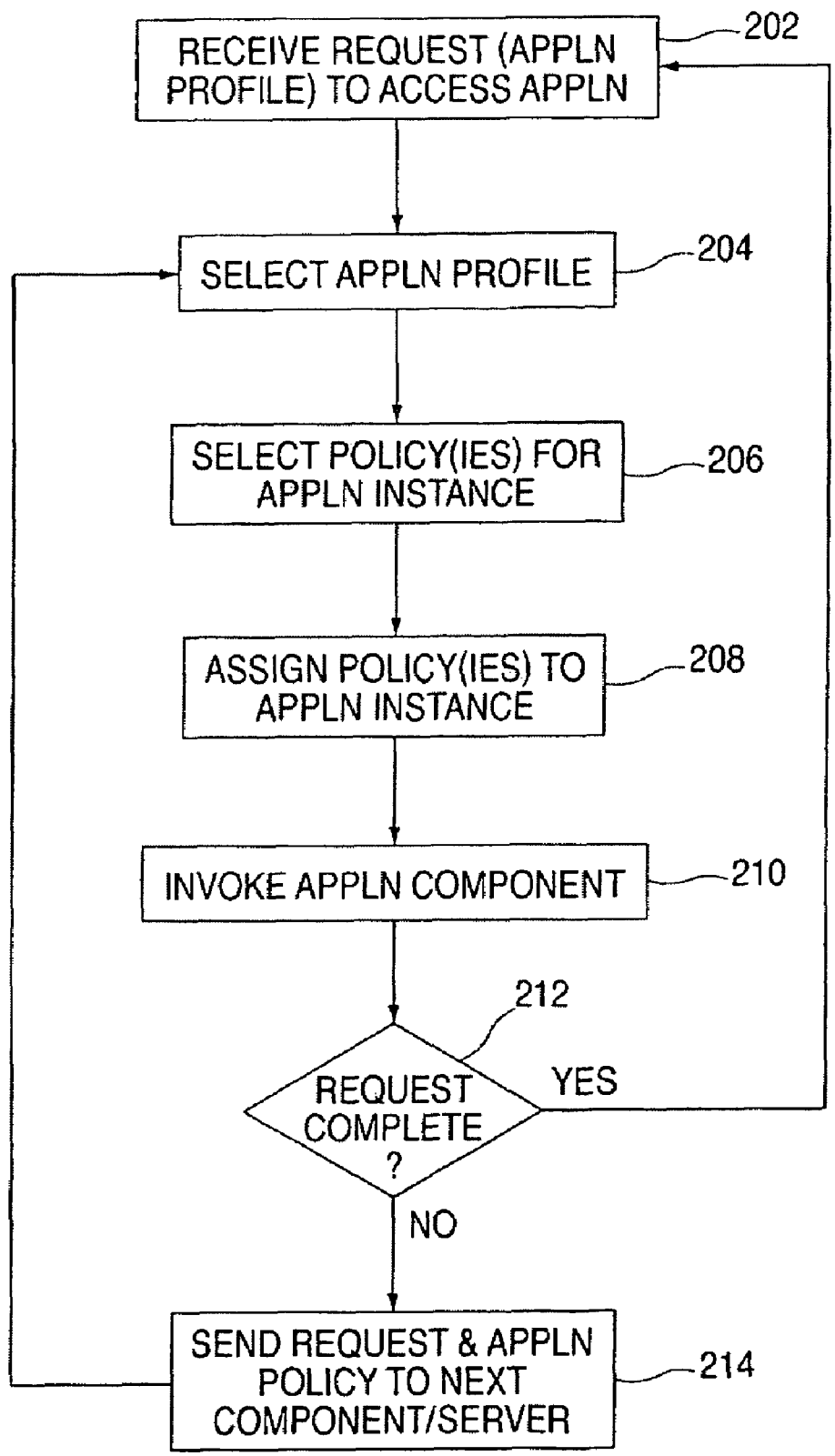
FIG. 2 is a flowchart describing the implementation of the dynamic policy assignment system in an exemplary embodiment.

The dynamic policy assignment system process is described in FIG. 2. A request to access an application is received from client system 102 along with application profile 108 at step 202. The request carries a task name. Server 104, which received the request, selects the application profile at step 204. Based upon the task name provided in the application profile 108, the dynamic policy assignment system selects one or more policies for the application instance at step 206. At step 208, the dynamic policy assignment system assigns the policy(ies) to the specific application instance. The host system executes the application on behalf of the client system at step 210. The dynamic policy assignment system then checks the request to see if there are additional applications or component services to be provided to the client system 102 at step 212. If not, the process reverts to step 202.

If there are additional applications or components to be provided at step 212, the dynamic policy assignment system forwards the request to another component or server 106 for processing along with the application profile at step 214. The process then returns to step 204 whereby the dynamic policy assignment system executing on server 106 selects the next application profile.

In a preferred embodiment, the dynamic policy assignment system is implemented in a J2EE domain and applies to enterprise Java beans (EJBs). It utilizes CORBA service contexts, a feature of the J2EE specification's required transport, RMI/IIOP. The IIOP protocol has a provision for transporting self-defining context. The preferred embodiment passes an application task name in the IIOP request message as a service context.

A preferred embodiment of the invention also implements an application profile as a named profile, comprised of a task name and a policy such as an access intent policy. The policy is dynamically selected by the dynamic policy assignment system. An access intent policy refers to a set of attributes that describes how an object's (e.g., an entity bean) persistent state will be managed, e.g., by the EJB container (container managed persistence) or by the EJB itself (for bean managed persistence).

The preferred J2EE embodiment implements the application profile task names by providing the J2EE application as a default task name. Another application task name may be optionally configured. An EJB method may be configured with a special descriptor called a run-as-task descriptor, which includes the following possible values: caller, own, and specified. Caller specifies 'run with caller's task name' as the current task name and is the default. 'Own' specifies 'run with the application name of the application containing the current component (e.g., EJB) as the task name. 'Specified' specifies an explicit task name to run with as the current task name.

When an EJB method is invoked, in the preferred embodiment, its run-as-task descriptor determines what task name value is made current during the execution of the method in question. Development and deployment tools are preferably provided that enable the creation of application profiles and assignment of task names and run-as-task descriptors. The descriptor is stored by the development tools as additional metadata kept with the application.

At runtime, the preferred embodiment determines the current task name. The EJB container (or EJB itself for bean managed persistence) uses the current task name to acquire the policy associated via mapping to the current task name. This provides a dynamic way for an application to select a policy. This technique may be used to map to any type of policy, including access intent policies, so long as the policy owner is able to access the current task name. The current task name is made available from the component's own invocation context by looking up java:comp/service/ApplicationProfile.

Figure 3:
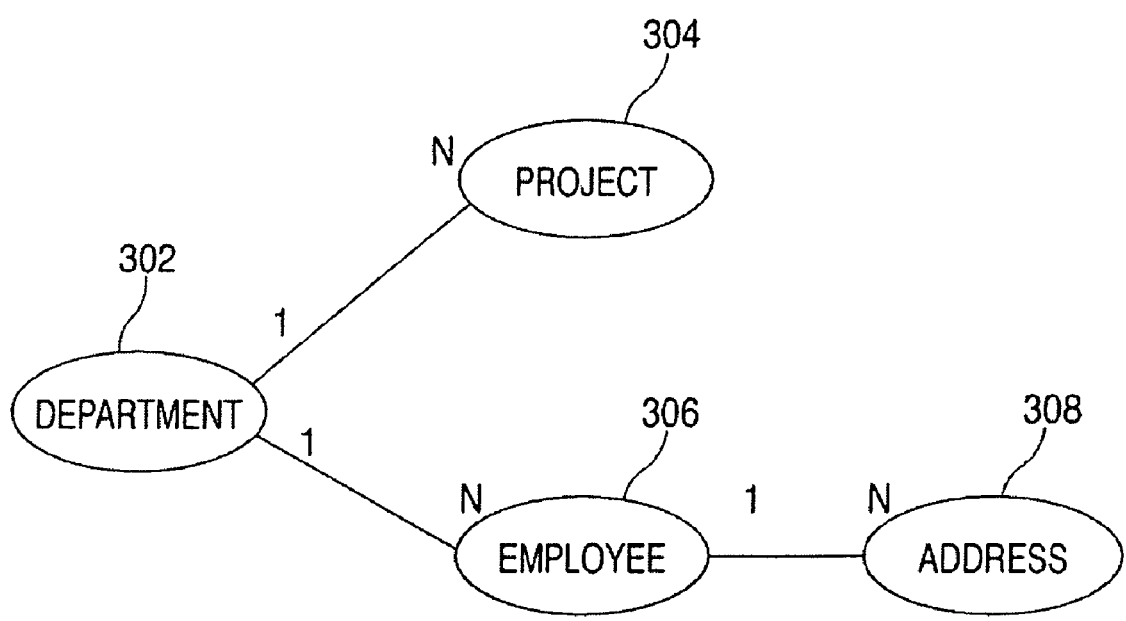
FIG. 3 is a diagram depicting an application and relational elements for a CMR in an exemplary embodiment.

A sample implementation will now be described with respect to a specific application utilizing a J2EE environment and the graphical representation of FIG. 3. Given CMP EJBs Department 302, Project 304, Employee 306, and address 308, related to one another via container managed relationships (CMR) are shown in FIG. 3. The following two sample access intent policies are provided for illustration.

DepartmentDeepReadOptimisticUpdate, with attributes
    accessType=optimisticUpdate
    readAhead=Department.Employee.Address
DepartmentFullReadOptimisticRead with attributes
    accessType=optimisticRead
    readAhead=Department.Employee.Address.Department.Projects The access type attribute informs the EJB container that the EJB will be updated and that the concurrency control mode is optimistic. The readAhead attribute indicates the requested read ahead pattern. This means, given a set of EJBs related to one another via CMR, load the Employee and Address data or the Employee, Address, and Project data at the same time that the data is loaded. The following application profiles are then defined as provided below.

Figure 4:
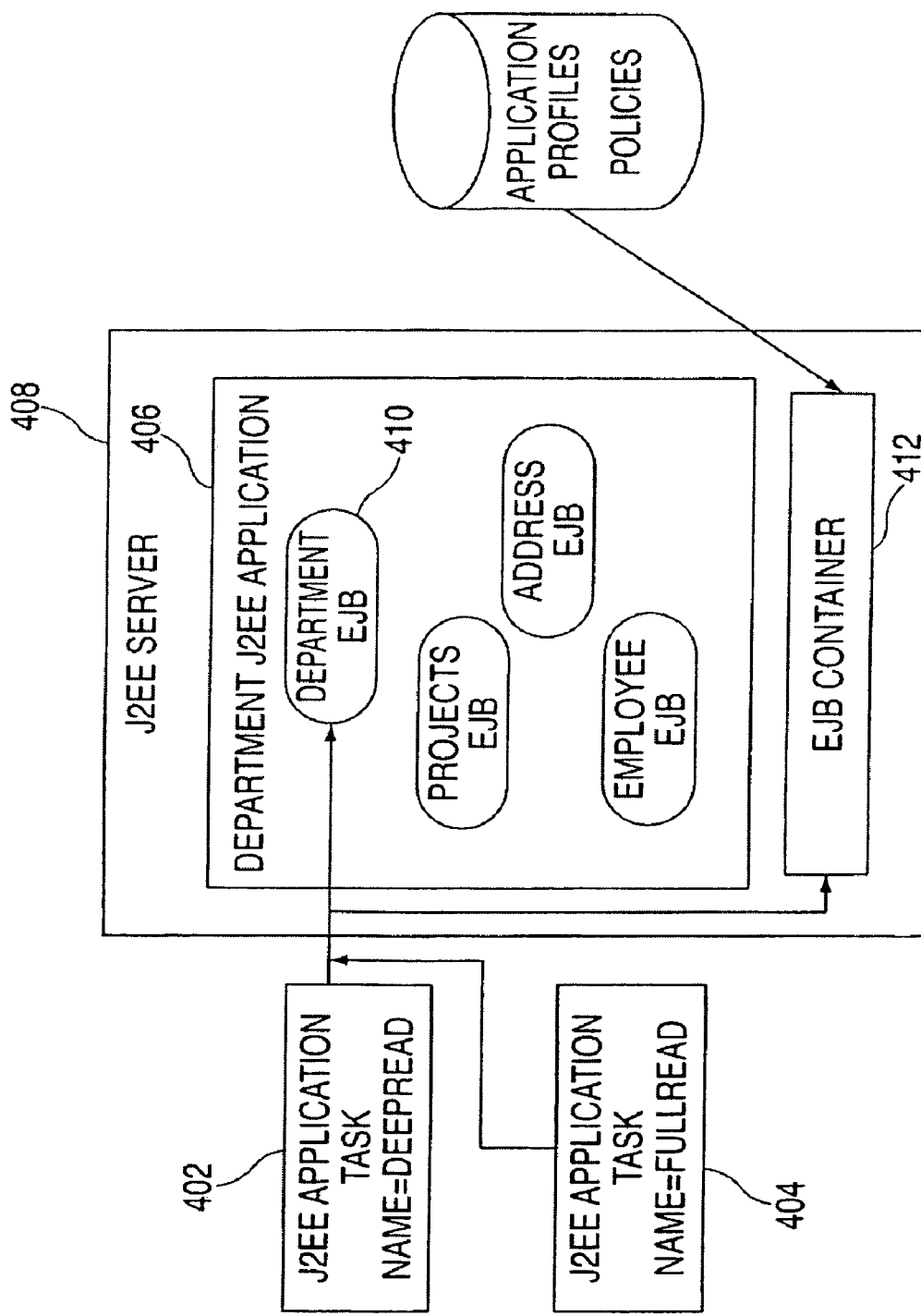
FIG. 4 is a block diagram illustrating a J2EE system upon which the dynamic policy assignment system is implemented in a preferred embodiment.

DepartmentDeepReadAndUpdate
    taskname=DeepRead
    access intent policy=DepartmentDeepReadOptimisticUpdate
DepartmentFullReadOnly
    taskname=FullRead
    access intent policy=DepartmentFullReadOptimisticRead FIG. 4 is a diagram depicting the use of a Department application referenced in FIG. 3 that is accessed by two clients utilizing the application profiles described in the example above. Two client applications 402 and 404, as assigned application profile task names, DeepRead and Full-Read, respectively. The application profiles described above are assigned to the Department application 406. The department application 406 is deployed in a J2EE server 408. When the client applications execute, client 402 invokes a method on the Department EJB 410. The task name flows in the RMI/IIOP message. The EJB container 412, during activation of the Department EJB 410, checks the current invocation context to get the task name (i.e., DeepRead). The EJB container 412 uses the task name to retrieve the access intent policy to which the current task name, DeepRead, maps (i.e., DepartmentDeepReadOptimisticUpdate), and uses it to govern the persistence access for the Department EJB 410. Client 404, assigned task name FullRead, invokes a method on the Department EJB 410. The task name flows in the RMI/IIOP message. The EJB container 412, during activation of the Department EJB 410, checks the current invocation context to get the task name (i.e., FullRead). The EJB container 412 uses the task name to retrieve the access intent policy to which the current task name, FullRead, maps (i.e., DepartmentFillReadOptimisticRead) and uses it to govern the persistence access for the Department EJB 410.

The dynamic policy assignment system provides a mechanism that enables an application server to select from a set of policies assigned to an application, using an application profile, as the basis for choosing which policy(ies) to apply for a given client interaction. The policies are dynamically assigned according to the application profile which alleviates the need to produce multiple copies of an application.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A storage medium encoded with machine-readable computer program code for providing context-based dynamic policy assignment, said storage medium including instructions for causing a computer to implement a method, comprising:

receiving a request at a first host system to execute a first application on behalf of a client system, said request including an application profile;

based upon a profile ID and one or more task names associated with said application profile, selecting at least one policy for an application instance related to said request and mapping said one or more task names to a plurality of policies, wherein at least one of the plurality of policies is associated with said client system;

associating said at least one policy to said application instance;

executing said first application on behalf of said client system;

changing dynamically said at least one policy associated with said application instance based upon a task name change;

forwarding said request to a second host system along with said application profile, wherein said request contains a request to access a second application stored on said second host system and wherein a dynamic policy assignment system associates at least one policy with said second application instance based on a task name associated with said second application; and a web based programming language method including a run-as-task descriptor operable for determining a current task name value associated with a request to access an application, wherein said run-as-task descriptor values include:

caller, operable for specifying a current task name as 'run with caller's task name';

own, operable for specifying a current task name as 'run with an application name of an application containing a current component'; and specified, operable for specifying an explicit task name to run as a current task name.

2. The storage medium of claim 1, wherein said first host system and said second host system are operating in a web based programming language environment and provide web based programming language services to said client system via said dynamic policy assignment system.

* * * * *